Feb. 24, 1931.   J. RICHTER   1,794,322
MANUFACTURE OF TYPOGRAPHICAL FORMS
Filed April 21, 1925
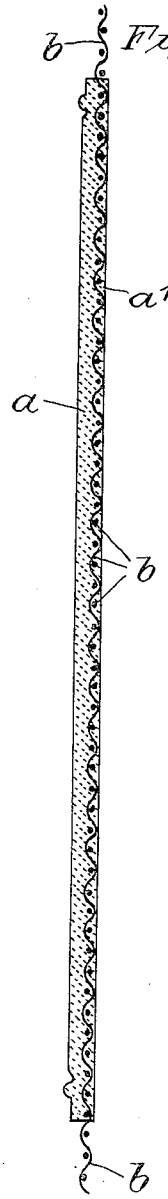
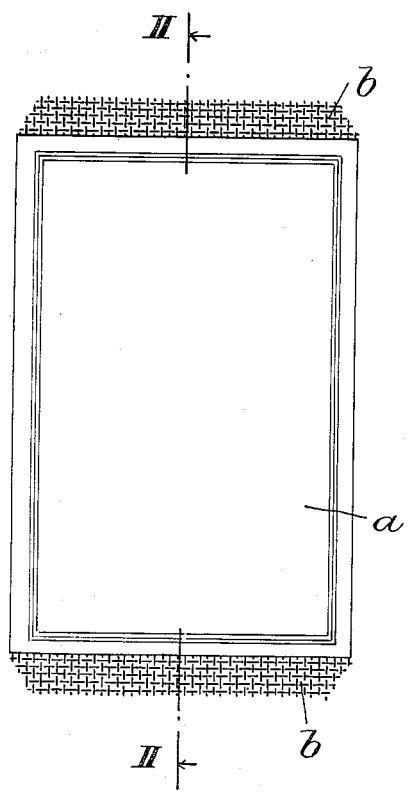
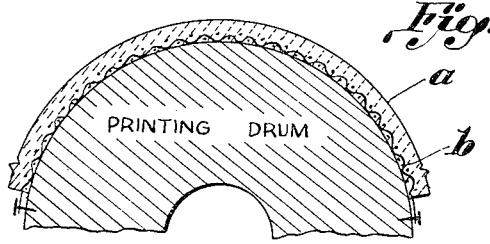

Patented Feb. 24, 1931

1,794,322

UNITED STATES PATENT OFFICE

JOSEPH RICHTER, OF GENEVA, SWITZERLAND

MANUFACTURE OF TYPOGRAPHICAL FORMS

Application filed April 21, 1925, Serial No. 24,895, and in Switzerland May 19, 1924.

This invention relates to an improved method of making typographical forms.

The object of the invention is to provide a typographical form from plastic organic substances by forming an intaglio mould of a plastic substance by means of a typographic plate pressed into said substance when softened by heat and forming the typographical form by pressing a further substance softened by heat in said mould, with a metallic skeleton reinforcement.

This invention may be conveniently carried out in the following manner: Assuming that it is desired to reproduce several copies of a stereotype plate or block in zinc for instance, which result is usually obtained by galvano-plastics, the stereotype plate and an acetyl cellulose composition are simultaneously heated on a brazier until the acetyl cellulose is softened to a predetermined degree. Then the form and the mass of acetyl cellulose are placed one upon the other between the plates of a press, the action of which causes the stereotype plate to enter the mass of acetyl cellulose. After this operation the mass shows in intaglio the reliefs of the block or plate and is used as a mould for making as many casts resembling the block or plate as may be desired.

These reproductions are obtained by impressing the mould in masses of acetyl cellulose previously softened by any suitable means of heating. The composition of these acetyl cellulose substances employed for the reproduction is such that their softening is produced at a temperature a little lower than that necessary for softening the mass of acetyl cellulose employed in the manufacture of the mould.

It will be understood that the softening and conversely the hardening point of a given mass of acetyl cellulose will vary according to the solvent employed, and the quantity of camphor or substitutes and of filling agents incorporated in the mixture. Reference is made to applicant's Austrian Patent 60,173, issued July 10, 1913, with reference to which it is pointed out that the material therein described has a lower softening point than materials theretofore used.

Practice has shown that it is most convenient to make use for the reproduction of the plates of such a composition of acetyl cellulose substances which softens already at a temperature of between 60 to 70° C. whilst the mass employed in the manufacture of the mould is preferably made to soften only at a considerably higher temperature, say about 140° C.

A lower mollifying point of the plate substance renders the cleanness of the plate rather problematic and an increase of the softening point of the matrix substance tends to make the same rather brittle.

In a general way, both the matrix and the plate are made from similar acetyl cellulose dissolvable in acetic ether and the difference of their softening point may be obtained simply by more or less addition of neutral filling material.

The impression of the mould in the mass of acetyl cellulose necessary for the reproductions is also effected in the press. When the mass and the mould are placed on the plate of the press a metallic trellis or other skeleton is placed beneath the mass which by means of the pressure necessary for impressing the mould in the mass, becomes incrusted in the mass of acetyl cellulose.

Numerous copies of the form thus obtained reproducing the original stereotyped plate may be produced very rapidly and owing to its flexibility it may be fixed on the cylinders of rotary printing machines. Its metallic skeleton allows of its being fixed directly on the stereotype forms used for printing on rotary machines as shown in Fig. 3.

The invention is more particularly described with reference to the accompanying drawings in which:—

Fig. 1 is a plan view of the printing plate.

Fig. 2 is a sectional elevation on an enlarged scale on the lines II—II of Fig. 1.

Fig. 3 is a partial sectional view on an enlarged scale, showing the sheet curved to fit a printing cylinder.

The mass of acetyl cellulose is represented by $a$. $b$ represents the skeleton frame work and $a'$ the back layer of the mass which penetrates through the relatively wide meshes of the gauze of the frame work. The width of the meshes of the wire gauze of the skeleton frame work are judiciously chosen so that each wire portion is coated by the mass and the mass penetrates through the meshes and constitutes a very thin layer behind the wire gauze.

I declare that what I claim is:—

A method of making typographical forms of a plastic organic substance consisting in heating a mass of plastic organic substance, pressing thereon a stereotype plate to form an intaglio mould of said mass, softening a further relatively easily softened plastic organic substance, providing a metallic skeleton frame work beneath said softened mass, pressing said mass into said intaglio mould whereby said metallic skeleton becomes embedded in said plastic mass and bending such metallic skeleton with said substance intimately united to it into the form of an enclosing cylinder for the printing roll.

In witness whereof, I have hereunto signed my name this 1st day of April 1925.

JOSEPH RICHTER.